United States Patent [19]

Burnside, III

[11] Patent Number: 4,532,912

[45] Date of Patent: Aug. 6, 1985

[54] PORTABLE COOKING APPARATUS

[76] Inventor: Royal D. Burnside, III, 6427½ E. Wallisville Rd., Baytown, Tex. 77520

[21] Appl. No.: 599,588

[22] Filed: Apr. 12, 1984

[51] Int. Cl.³ .......................... F24B 3/00; F16M 11/38
[52] U.S. Cl. ........................................ 126/30; 126/29; 248/166; 248/168; 248/436
[58] Field of Search ................. 126/29, 30, 9 R, 9 A, 126/9 B; 248/165, 166, 167, 168, 170, 436

[56] References Cited

U.S. PATENT DOCUMENTS 2,604,884  7/1952  Walker ................................. 126/30
3,094,113  6/1963  Avila ................................... 126/30

Primary Examiner—Samuel Scott
Assistant Examiner—G. Anderson
Attorney, Agent, or Firm—Bill B. Berryhill

[57] ABSTRACT

Portable cooking apparatus including a support base, a support column and a grill member. The support column is pivotally attached to the support base for movement from a first position, adjacent the support base, to a second position extending upwardly from the support base. The grill member is selectively positionable on the support column and removable therefrom to allow the support column to assume the first position.

12 Claims, 4 Drawing Figures

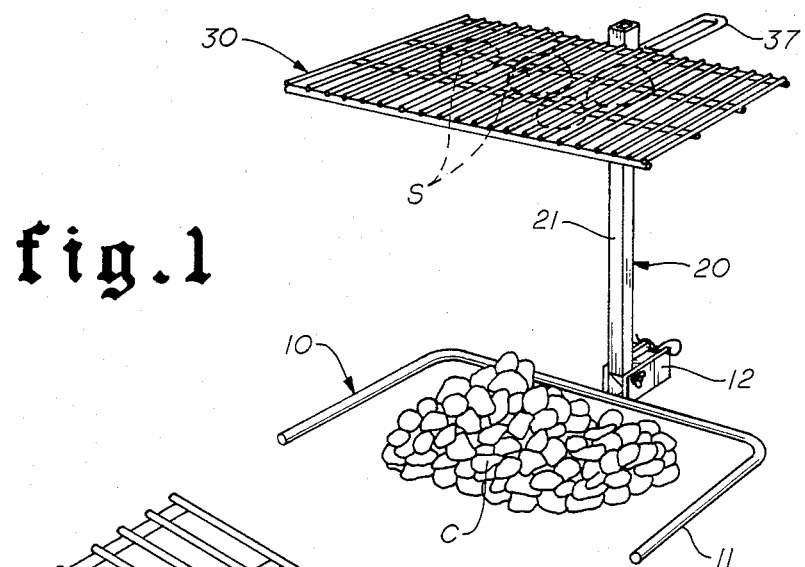
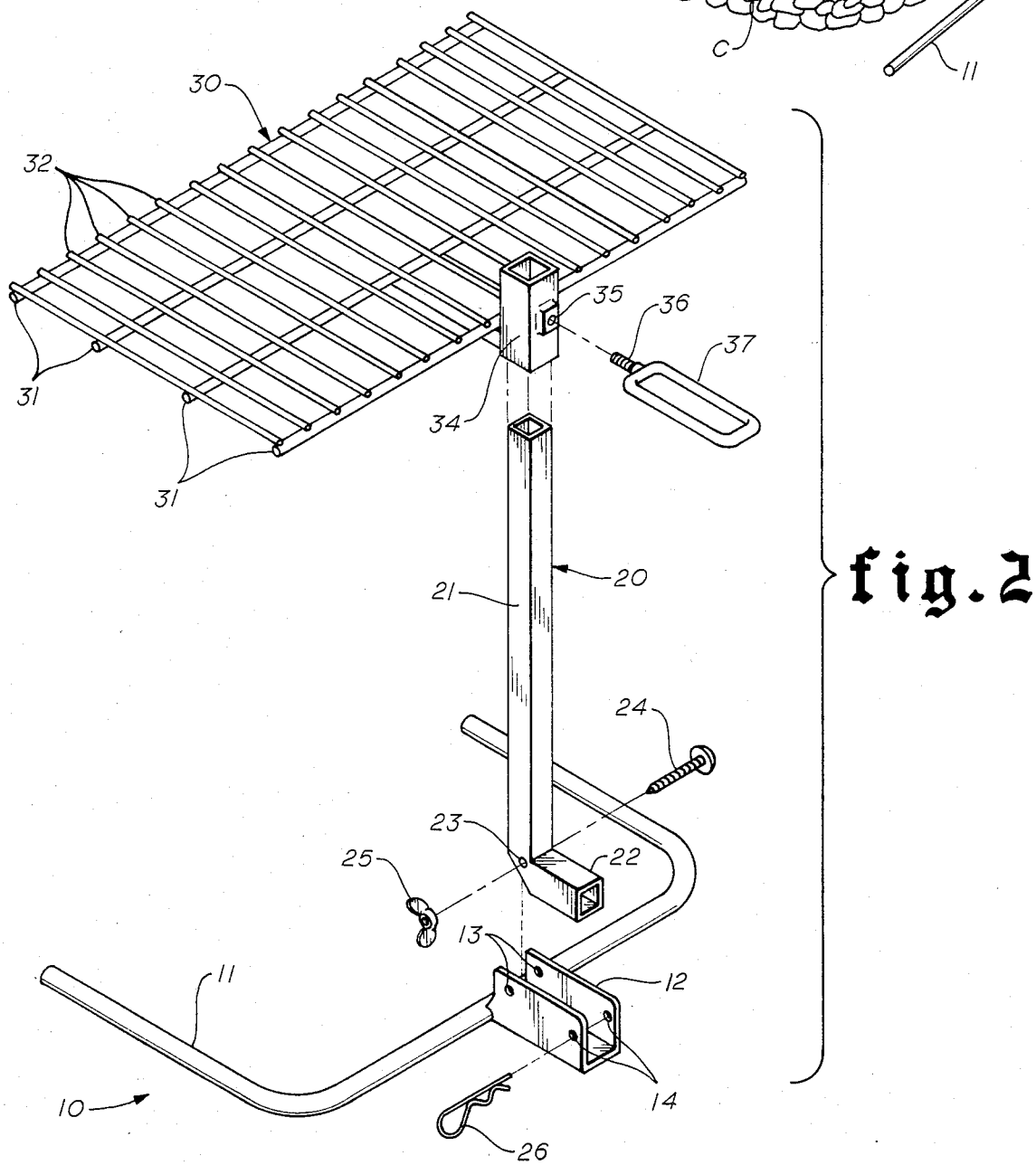

PORTABLE COOKING APPARATUS

BACKGROUND OF THE INVENTION

1. Field of the Invention

The present invention pertains to portable cooking apparatus. Specifically, the present invention pertains to apparatus for both indoor and outdoor cooking over an open fire or other source of concentrated cooking heat.

2. Description of the Prior Art

Outdoor cooking and barbecuing are extremely popular today. Many types of portable cooking grills have heretofore been developed for such cooking. Examples may be seen in U.S. Pat. Nos. 3,498,210; 3,641,922; and 4,117,825. Some of these portable cooking devices are especially designed for outdoor use. Others, such as the aforementioned U.S. Pat. Nos. 3,641,922 and 4,117,825, are designed for both outdoor use over an open fire and indoor use over the fire on the grate of a fireplace. While many of these devices may be disassembled for portability, they are not extremely compact when disassembled and in most cases, when disassembled, the components are totally disconnected so that components are frequently lost or damaged. The fact that developments in the field continue to be made indicate a continuous search for a better design.

SUMMARY OF THE INVENTION

The present invention provides portable apparatus for cooking over a fire or other concentrated source of cooking heat and may comprise: a support base for supporting the apparatus generally above a fire or other source of heat; a support column pivotally attached to the support base for movement from a first position, generally next to the support base, to a second position, extending upwardly from the support base; and a grill member for attachment to the support column, when in the second position, for supporting the grill member and food to be cooked thereon. The support column may also be provided with a short arm portion extending generally perpendicularly therefrom near the base thereof which, when the column member is in the first position, extends upwardly from the base. The grill member is selectively detachable from the support column, and selectively attachable to the arm portion, when the support column is in the first position, for storing the grill member adjacent the base member.

The resulting cooking apparatus is extremely portable and provides a grill member which is selectively positionable at variable heights above the cooking fire. The support column is easily pivoted to a first or stored position and the grill member is easily attachable to an arm extension thereof so as to provide a very neat and compact stored position. The apparatus is easily usable both for outdoor cooking and for indoor cooking over the grate of a fireplace. Many other objects and advantages of the invention will be understood from reading the description which follows in conjunction with the accompanying drawings.

BRIEF DESCRIPTION OF THE DRAWINGS

FIG. 1 is a perspective view of portable cooking apparatus, according to a preferred embodiment of the invention, shown in outdoor use for cooking over a bed of coals;

FIG. 2 is an exploded perspective view of the portable cooking apparatus, according to a preferred embodiment of the invention, showing the components thereof in detail;

DESCRIPTION OF A PREFERRED EMBODIMENT

Figure 3:
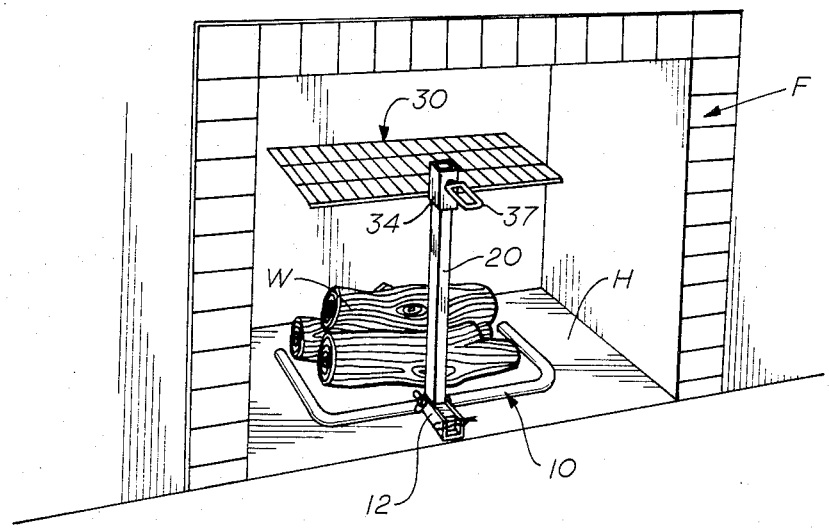
FIG. 3 is a pictorial perspective rendering of the portable cooking apparatus of the present invention, showing the apparatus disposed for cooking on the hearth of a fireplace.

Referring first to FIG. 1, the portable cooking apparatus of the present invention comprises three major components, a support base 10, a support column 20, and a cooking grill 30. As shown in FIG. 1, the support base 10 is resting on the ground generally surrounding a bed of coals C or some other source of concentrated cooking heat. The grill member 30 is supported on the support column 20 for cooking steaks S of some other food. In FIG. 3, the cooking apparatus is shown cooking indoors in a fireplace, the base 10 thereof being supported on the fireplace hearth H and the grill 30 being supported over a wood fire W for cooking thereon.

As best seen in FIG. 2, the support base 10 may be formed from a U-shaped rod or structural member 11 to the center of which is attached a channel-like bracket 12. Corresponding holes 13 and 14 may be provided in opposite flanges of the channel bracket 12.

The support column 20 may be made of tubular stock and includes a relatively long and slender column portion 21 and near the base thereof a short arm portion 22 extending generally perpendicularly therefrom. A hole 23 may be provided through the support column near the base thereof and when the support column 20 is assembled, the hole 23 is aligned with corresponding holes 13 in the support base bracket 12 so that a machine screw 24 may be inserted through these holes for engagement by a wing nut 25. When so assembled, the support column 20 is pivotable from a first position, generally next to said support base 10, to a second position (as shown in FIGS. 1, 2 and 3), extending upwardly from the support base 10. With the support column 20 in the second or upwardly extending position, the end of the short arm extension 22 will be disposed adjacent the corresponding holes 14 in the support base bracket 12. A hairpin spring clip 26 may be inserted through the corresponding holes 14 with the support column 20 in the upwardly extended position preventing the support column 20 from being pivoted to the first position adjacent the base member 10.

The grill member 30 may include a plurality of parallel rods or strips 31 and perpendicular thereto a series of mutually parallel rods or strips 32. Attached to one of the rods 31 on the edge of the grill member 30 is a tubular collar 34 which is surroundingly and slidingly engageable with the column 21. A threaded hole 35 may be provided through the support collar 34 for threaded engagement by a corresponding threaded fastener 36 affixed to a handle member 37. After threaded engagement of the fastener member 36 with the hole 35, the handle member 37 may be rotated in the proper direction to cause the fastener member 36 to be threaded into or out of engagement with the support column 20, if the collar 34 is placed thereon as in FIGS. 1 and 2.

With the portable cooking grill assembled as in FIGS. 1 and 2, the handle 37 may be rotated in one direction to disengage the support column 20 allowing the grill member 30 to be selectively positioned at variable heights above the base member 10. When the proper position is selected, the handle member 37 is rotated in the opposite direction until the fastener member 36 firmly engages the support column 20 fixing the grill 30 at a desirable height above the cooking fire.

Figure 4:
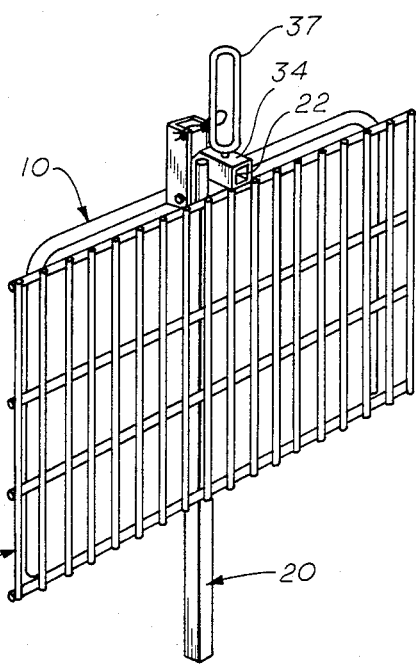
FIG. 4 is a perspective view of the portable cooking apparatus of the present invention with the components thereof folded in place in a stored position.

For storing or travel, the grill member 30 is first removed from the support column 20. Then the spring clip 26 is removed so that the support column 20 is allowed to pivot from the second and upwardly extended position to the first or stored position adjacent the base member 10 as shown in FIG. 4. Once the support column 20 has been pivoted to the first position, the arm extension 22 thereof extends upwardly or away from the gase member 10. Then the collar 34 of the grill member 30 is placed over the arm extension 22 of the handle 37 tightened so that the entire assembly is then in the stored or carrying position of FIG. 4. As can be seen, this provides an extremely compact assembly.

Thus, the cooking apparatus of the present invention is versatile, being suitable for both indoor and outdoor cooking. The grill is easily adjustable for cooking height. The entire assembly is easily collapsed to a compact storing position. It is relatively easy and cheap to manufacture.

A single embodiment of the invention has been described herein. However, many variations of the invention may be made without departing from the spirit of the invention. Accordingly, it is intended that the scope of the invention be limited only by the claims which follow.

I claim:

1. Portable apparatus for cooking over a fire or other concentrated source of cooking heat comprising:
   a support base for supporting said apparatus generally above said first or other source of heat;
   a support column attached to said support base for pivoting movement from a first position, generally next to said support base, to a second position extending upwardly from said base; and
   a grill member for attachment to said support column, when in said second position, for supporting said grill member above said first or other source of heat, said grill member being removable from said support column to permit said support member to be moved to said first position, said support column being provided near the base thereof with a relatively short arm extension substantially perpendicular thereto which, when said support column is in said first position, extends upwardly from said base for attachment of said grill member thereto to store said grill member in a position adjacent said base member.

2. Portable cooking apparatus as set forth in claim 1 in which said grill member includes means for selectively positioning said grill member at variable heights above said base member.

3. Portable cooking apparatus as set forth in claim 2 in which said means for selectively positioning said grill member includes a collar for circumscribing and sliding engagement with said support column and a fastener member carried by said collar for engagement with said support column to fix said collar and said grill member to said support column.

4. Portable cooking apparatus as set forth in claim 3 in which said fastener member is threaded for threaded engagement with a correspondingly threaded hole through said collar and provided with a handle for threaded rotation of said fastener member into and out of engagement with said support column.

5. Portable cooking apparatus as set forth in claim 1 in which said short arm extension is engageable by latch means, when said support column is in said second position, to latch said support column in said second position.

6. Portable cooking apparatus as set forth in claim 1 in which said grill member includes a collar portion surroundingly engageable with said support column, when in said second position, and movable thereon to selectively position said grill member at variable heights above said base member, said collar portion being surroundingly engageable with said short arm extension, when said support column is in said first position, for storing said grill member in a position adjacent said base member.

7. Portable cooking apparatus as set forth in claim 6 including fastener means carried by said collar, engageable with said support column and said short arm extension when said support column is in said second and first positions, respectively, to fix said grill member to said support column and short arm extension, respectively.

8. Portable apparatus for cooking over a fire or other concentrated source of cooking heat comprising:
   a support base for supporting said apparatus generally above said fire or other source of heat;
   a support column pivotally attached to said support base for movement from a first position, generally next to said support base, to a second position, extending upwardly from said support base, and having a short arm portion extending generally perpendicularly therefrom near the base thereof which, when said column member is in said first position, extends upwardly from said base; and
   a grill member selectively attachable to said support column, when in said second position, for support above said fire or other source of heat, and selectively attachable to said arm portion when said support column is in said first position for storing said grill member adjacent said base member.

9. Portable cooking apparatus as set forth in claim 8 in which said grill member includes a collar portion surroundingly engageable with said support column, when in said second position, and movable thereon to selectively position said grill member at variable cooking heights above said base member.

10. Portable cooking apparatus as set forth in claim 9 in which said collar portion is disengageable from said support column, to allow pivoting of said support column to said first position, and engageable with said short arm portion for said storing of said grill member adjacent said base member.

11. Portable cooking apparatus as set forth in claim 10 including fastener means carried by said collar selectively engageable with said support column and said short arm portion, respectively, to fix said grill member to said support column and short arm portion, respectively.

12. Portable cooking apparatus as set forth in claim 8 including latch means engageable with said support column, when in said seconds position, to prevent pivoting of said support column to said first position.

* * * * *